United States Patent [19]
Bozik

[11] 3,791,623
[45] Feb. 12, 1974

[54] LOCKABLE TENSIONING DEVICE

[76] Inventor: Maynard L. Bozik, P.O. Box No. 976, Pompano Beach, Fla. 33441

[22] Filed: May 17, 1972

[21] Appl. No.: 253,944

Related U.S. Application Data

[63] Continuation-in-part of Ser. No. 112,528, Feb. 4, 1971, abandoned.

[52] U.S. Cl............... 254/51, 105/368 T, 248/361, 280/179 A, 254/161
[51] Int. Cl............................................ A63b 61/04
[58] Field of Search......... 254/51, 52, 64, 161, 164; 280/179 A; 248/361; 105/368 T

[56] References Cited
UNITED STATES PATENTS

| | | | |
|---|---|---|---|
| 349,985 | 9/1886 | De Witt | 254/161 |
| 410,077 | 8/1889 | Doud | 254/161 |
| 1,157,324 | 10/1915 | Olson | 254/161 |
| 2,457,389 | 10/1948 | Howe | 254/161 |
| 3,638,912 | 2/1972 | Moreno | 254/161 |

*Primary Examiner*—O. M. Simpson

[57] ABSTRACT

An anchored frame member having at least one protruding flange at one end, a rotatable axial member for tensioning flexible elements such as wire, rope, cable or the like inserted through apertures in said anchored frame, and a removeable locking member connectable to and coupled nonmoveably about said axial member and adjacent the frame flange, the flange prevents the rotational motion of said locking member and said axial member.

7 Claims, 7 Drawing Figures

MAYNARD L. BOZIK
INVENTOR.

LOCKABLE TENSIONING DEVICE

This is a continuation-in-part of the application of Maynard L. Bozik, under 37 CFR 1.60, for LOCKABLE TENSIONING DEVICE filed on Feb. 4, 1971, Ser. No. 112,528 now abandoned.

BACKGROUND OF THE INVENTION

This invention relates generally to a cable tensioning device, in which cables are used to secure and anchor objects, such as mobile homes, outdoor storage buildings or playground equipment to prevent movement of the objects along the ground. The device may be used for tensioning any flexible element such as wire, rope, cable straps or the like. In the past, tensioning devices have been very complex in design and operation requiring several different parts. Other prior art devices required axial movement of the axial member to lock the device. In the present invention, a tensioning device is provided having one locking part that is easily coupled or uncoupled from the tensioning axle.

BRIEF DESCRIPTION OF THE INVENTION

An anchored frame member having at least two parallel sides, each side having an aperture, and one side having generally parallel, overlapping flanged portions, a shaft member having an opening for receiving the end of a flexible member to be wound on the shaft member, the shaft rotatable in the apertures in the parallel frame sides, a tensioning member for rotational leverage coupled to said shaft, the shaft having a least one distinctive shape in cross-section, a locking member shaped to circumferentially fit about said shaft, said locking member having an aperture shaped substantially as the distinctive shape of said shaft and sized to fit between the generally parallel flanges of said one side of said frame, and retaining means for holding said locking means on to said shaft. The locking means is positioned between the flanges about the shaft after the flexible element has been tensioned by the rotation of the shaft, and the retaining member inserted. The shaft and locking member move as one unit and cannot rotate relative to each other and the locking member is fixed in place by the flange members protruding from the anchored frame.

It is an object of this invention to provide a non-complex tensioning device for flexible members.

It is another object of this device to provide a tensioning device having a shaft that is lockable by an axially moveable member.

And yet another object of this invention is to provide a tensioning device for a flexible element that is easily locked and unlocked.

In accordance with these and other objects which will be apparent hereinafter, the instant invention will now be described with particular reference to the accompanying drawings.

PREFERRED EMBODIMENT OF THE INVENTION

Figure 1:
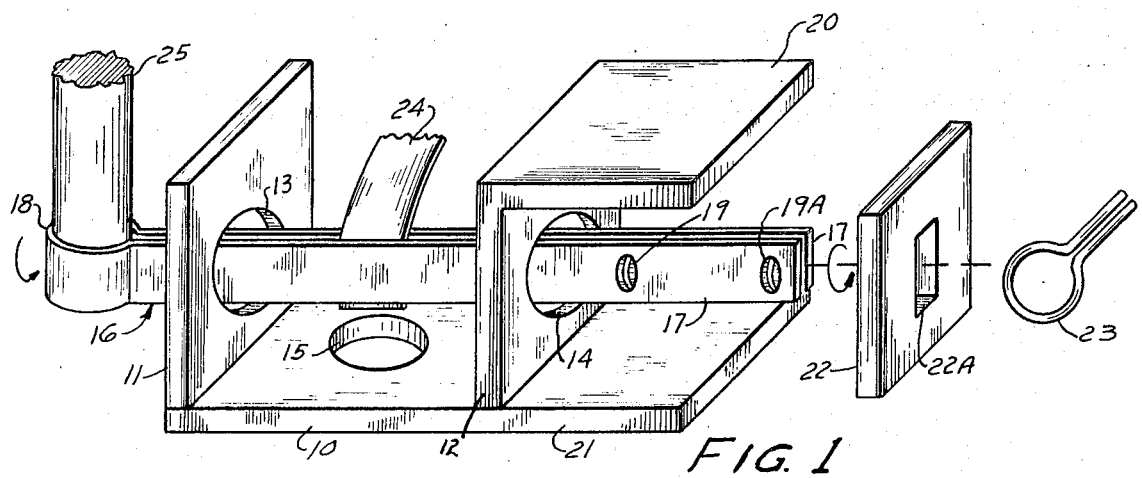
FIG. 1 is a perspective view of one embodiment of the lockable tensioning device.

Referring now to the drawings and in particular to FIG. 1, Applicants' invention can be seen in an explosive view. A structural housing 10 having parallel support members 11 and 12 arranged in generally a U-shaped fashion is shown. Support members 11 and 12 have axially aligned apertures 13 and 14 respectively. Base portion 10 also has an aperture 15 suitable for receiving an anchoring means 26 shown in FIG. 2. Holding flanges 20 and 21 respectively, are arranged substantially parallel and protrude from the outside surface of support member 12. Positioned within apertures 13 and 14 is a tensioning device or axis generally at 16 consisting of shaft portions 17 and a leverage receiving means 18. The tensioning bar 16 is axially aligned through and sized to rotate within apertures 13 and 14. As shown in the preferred embodiment shaft portions 17 are rectangular in cross-sectional shape and are spaced closely together with sufficient space however, to receive a flexible member 24 to be tensioned between shaft portion 17. Frictional forces between flexible member 24 between the shaft legs. A leverage bar 25 is inserted into the rod receiving portion 18 of the bar 16. Along the shaft axial line and adjacent flange portions 20 and 21 is disposed a rectangular locking member 22 and a retaining pin such as a cotter pin 23. In this configuration, the shaft 16 may be rotated.

Figure 2:
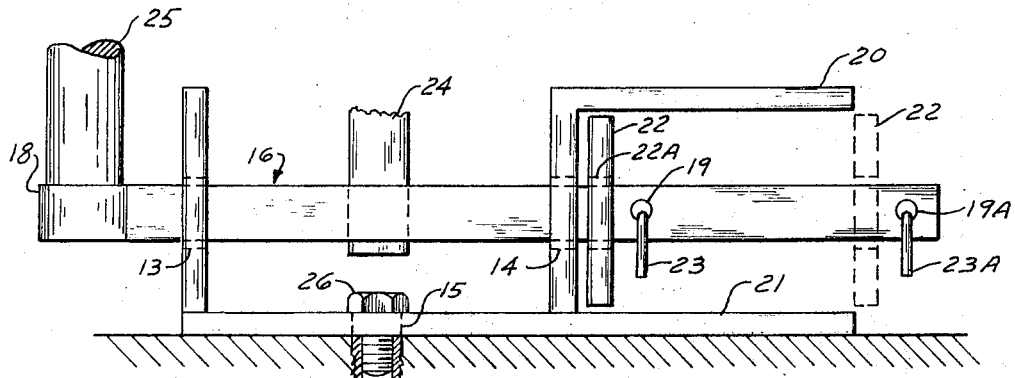
FIG. 2 is a side view partially cut away of the device shown in FIG. 1.

FIG. 2 shows the locking member 22 positioned to hold and prevent the tensioning bar 16 from rotating after the shaft has been rotated and the proper tenstion on flexible member 24 has been achieved. Locking member 22 is snuggly fit about shaft portion 17 of the tensioning bar 16 and locked between protruding flanges 20 and 21. The particular rectangular shape and the fit between aperture 22a of locking member and the shaft portion 17 prevent relative rotational motion between the tensioning shaft 16 and locking means 22. FIG. 2 shows the locking means 22 positioned about the tensioning bar 16 is a locked manner and firmly held by protruding flanges 20 and 21 thus preventing the entire tensioning shaft from rotating. The shaft portions 17 also have an aperture 19 for receiving a retaining means such as cotter pin 23 which prevents the inadvertent removal of the locking means 22. In FIG. 2 as anchoring member 26 is shown disposed through aperture 15 and secured into a permanent mounting such as the earth or a cement foundation. The shaft legs 17 extend beyond the ends of flange portions 20 and 21 to allow the locking means 22 to be positioned outside the flanges 20 and 21 while being retained on the shaft legs 17 by cotter pin 23a coupled through aperture 19a. Thus the shaft 16 may be rotated without the complete removal of locking means 22, thus preventing inadvertent loss or falling off of the locking means 22. The locking means will be on the shaft 16 ready for engagement with the flange portions 20 and 21 after the flexible member 24 is tensioned, thus preventing unnecessary slippage when the locking means 22 is inserted between the flanges.

Figure 3:
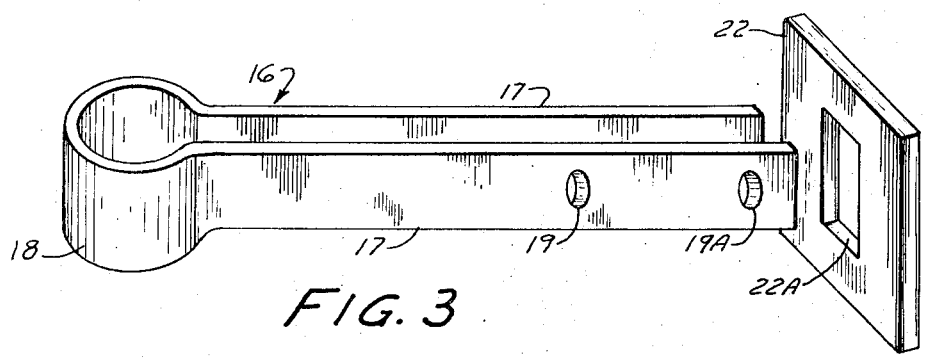
FIG. 3 is a perspective view of the rotating shaft and adjacent locking member of the device shown in FIG. 1.

FIG. 3 shows the heart of the tensioning and and locking elements, namely the tensioning shaft 16 having rectangular portions 17 which fit snuggly into the locking means aperture 22a thus preventing rotational motion between the locking member 22 and the tensioning bar 16. However, the locking means 22 is easily removed from the bar 16 by sliding it beyond the shaft 17 end after retaining pins 23 and 23a (FIG. 2) have been removed.

In operation the flexible member 24 is threaded between shaft portions 17. The frictional force may be increased by further windings or by otherwise securing the flexible member to or on the tensioning shaft 16. The tensioning shaft is then rotated by leverage means 25 either by hand or other mechanical means until the desired tension of flexible member 24 is achieved. A positive turning opening may be provided at 18. During this operation the locking means 22 is located at the extreme end of shaft 16. After the desired tension has been achieved, the locking member 22 is moved along shaft portion 17 until it is adjacent support member 12 and coupled between flange portion 20 and 21 of the frame structure. Retaining pin 23 is then inserted in aperture 19. Tension on handle 24 is released and the tension bar 16 is firmly held in position, the tension being retained on flexible member 24. To change the tension on or remove flexible member 24 the retaining pin 23 is removed from the shaft and locking member 24 is then moved along the shaft to the end adjacent aperture 19a. The tensioning bar may then again be rotated in the desired manner. Although in the preferred embodiment a rectangular shaft portion 17 configuration and a rectangular locking aperture 22a and flange locking member 22 relationship have been shown, other shapes may be used other than circular that would achieve and prevent rotation of the shaft, the locking member and frame while still allowing very easy removal and attachment of the locking member 22.

Figure 4:
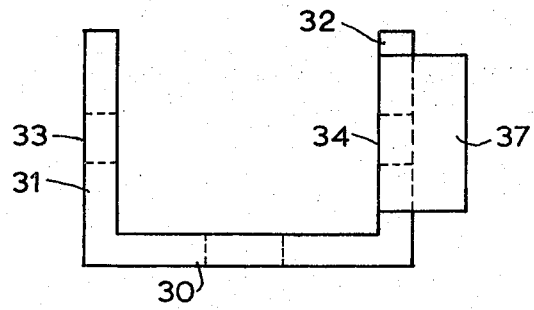
FIG. 4 is a side view of a second embodiment of the anchor frame member.
Figure 5:
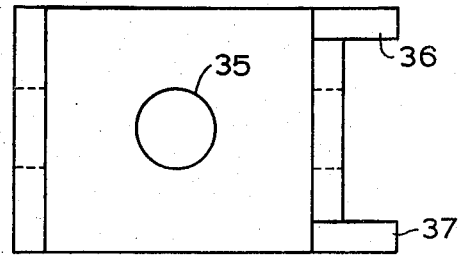
FIG. 5 is a top view of the frame member shown in FIG. 4.

Referring now to FIGS. 4 and 5, the housing is generally u-shaped with a base member 30 with two generally parallel support members 31 and 32 with aligned apertres 33 and 34 respectively. The base member 30 has anchoring support aperture 35 therein. The generally parallel side flanges 36 and 37 extend out from support member 32 to fix the position of a locking member as shown in FIGS. 1, 2 and 3.

Figure 6:
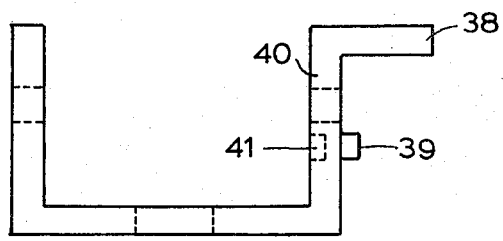
FIG. 6 is a side view of a third embodiment of the anchor frame member.

FIG. 6 shows another embodiment of the housing with a large upper flange 38 and a lower flange portion 39. The lower flange is formed by stamping the support member 40. The metal is moved from the depression 41 to the position shown by numeral 39.

Figure 7:
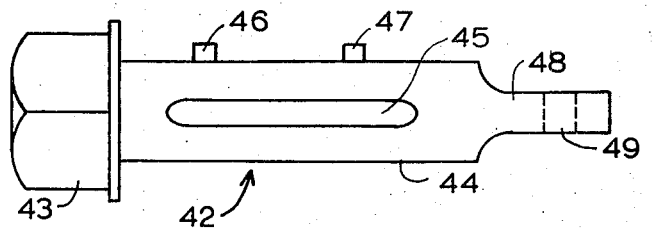
FIG. 7 is a side view of a second embodiment of the shaft member.

FIG. 7 shows another embodiment of the bar at 42. The bar includes a head 43 that may be rotated by a wrench. The body 44 of the bar has an aperture 45 for receiving a flexible member such as shown at 24 in FIG. 1. The protrusions 46 and 47 may be inserted into holes in the flexible member to lock the flexible member to the body 44. The distal end of the bar has a rectangular cross section at 48 to allow the locking member 22 to secure the bar in a housing such as shown in FIGS. 4 and 5. A cotter pin is placed in opening 49 to secure the locking member on the distal end 48.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A flexible member tensioning device for tensioning cable, wire or the like comprising:
   a frame having two substantially parallel support members, each support having an aperture, the apertures aligned axially,
   a tensioning shaft rotatably coupled to said frame through said apertures, said shaft having a receiving means for receiving a flexible member and a means for rotating said shaft,
   a locking means engagable with said shaft to prevent relative rotational motion between the locking means and said shaft,
   flange means on one of said support members, said flange means extending adjacent a portion of said locking means whenever said locking means is positioned in a locking position to prevent relative rotational motion movement between said locking means, said shaft and said frame,
   a locking means retaining pin, said tensioning shaft having a retaining pin aperture for receiving said pin, said aperture positioned in said tensioning shaft adjacent one end to place said pin in a position to prevent removal of said locking means.

2. A tensioning device as in claim 1, wherein: said shaft extends beyond the ends of said flange portions to allow said locking means to be positioned on said shaft beyond said flange.

3. A tensioning device as in claim 2, wherein: said shaft having a rectangular cross-section portion; and said locking means having a rectangular aperture.

4. A tensioning device as in claim 3, wherein: said shaft has two rectangular pronges.

5. A tensioning device as in claim 4, including: earth anchoring pin means coupled to said frame member for coupling said frame to the earth.

6. A tensioning device as in claim 5, wherein said rotating means includes:
   a leverage bar.

7. A tensioning device as in claim 3, wherein: said shaft includes a bolt head and a body portion with a circular cross section.

* * * * *